United States Patent
Sang et al.

(10) Patent No.: US 10,823,897 B2
(45) Date of Patent: Nov. 3, 2020

(54) LIGHT GUIDE PLATE AND MANUFACTURING METHOD THEREOF, BACKLIGHT MODULE AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Aixia Sang, Beijing (CN); Jinfeng Zhang, Beijing (CN); Fangfang Wu, Beijing (CN); Mookeun Shin, Beijing (CN); Hui Dong, Beijing (CN); Chao Zhang, Beijing (CN); Kaiwen Wang, Beijing (CN); Zhenyu Han, Beijing (CN)

(73) Assignees: Hefei Xinsheng Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/516,288

(22) Filed: Jul. 19, 2019

(65) Prior Publication Data
US 2020/0057187 A1  Feb. 20, 2020

(30) Foreign Application Priority Data
Aug. 15, 2018 (CN) .......................... 2018 1 0933451

(51) Int. Cl.
F21V 8/00 (2006.01)
(52) U.S. Cl.
CPC ......... G02B 6/0036 (2013.01); G02B 6/0035 (2013.01); G02B 6/0038 (2013.01);
(Continued)

(58) Field of Classification Search
None
See application file for complete search history.

(56) References Cited

U.S. PATENT DOCUMENTS 5,552,907 A * 9/1996 Yokota ...................... F21V 5/04
349/112
6,467,922 B1 * 10/2002 Blanc .................. G02B 6/0038
362/338
(Continued)

FOREIGN PATENT DOCUMENTS

CN  2735384 Y  10/2005
CN  2791693 Y  6/2006
(Continued)

OTHER PUBLICATIONS

Shin et al, Transparent Displays Utilizing Nanopatterned Quantum Dot Films, Published online on Feb. 6, 2018, Scientific Reports (Year: 2018).*
(Continued)

*Primary Examiner* — Evan P Dzierzynski
*Assistant Examiner* — Keith G. Delahoussaye
(74) *Attorney, Agent, or Firm* — Fay Sharpe LLP (57) ABSTRACT

Provided are a light guide plate and a manufacturing method thereof, a backlight module and a display device, in the field of display technology. The light guide plate includes: a light guide plate body, and a quantum dot film layer on a light exiting surface of the light guide plate body. The quantum dot film layer is prepared from a transparent material mixed with a quantum dot material by nano imprinting. According to the present disclosure, the quantum dot material is mixed into the transparent material, and the quantum dot film layer is formed on the light exiting surface of the light guide plate body by nano imprinting.

20 Claims, 8 Drawing Sheets

(52) U.S. Cl.
CPC ......... *G02B 6/0043* (2013.01); *G02B 6/0053* (2013.01); *G02B 6/0065* (2013.01)

(56) References Cited

U.S. PATENT DOCUMENTS

| | | | | |
|---|---|---|---|---|
| 9,732,939 | B2* | 8/2017 | Baek | G02B 6/0036 |
| 2006/0245061 | A1* | 11/2006 | Choi | G02B 27/0994 |
| | | | | 359/618 |
| 2006/0245212 | A1 | 11/2006 | Wei et al. | |
| 2007/0279935 | A1* | 12/2007 | Gardiner | G02B 6/0053 |
| | | | | 362/610 |
| 2008/0232135 | A1* | 9/2008 | Kinder | G02B 6/0053 |
| | | | | 362/615 |
| 2011/0013168 | A1* | 1/2011 | Park | G02B 6/0036 |
| | | | | 355/71 |
| 2011/0164431 | A1* | 7/2011 | Anandan | G02B 6/0036 |
| | | | | 362/606 |
| 2011/0222311 | A1* | 9/2011 | Kinder | G02B 6/002 |
| | | | | 362/611 |
| 2012/0086887 | A1* | 4/2012 | Lee | G02B 5/3058 |
| | | | | 349/62 |
| 2015/0369995 | A1* | 12/2015 | Wu | G02B 6/0043 |
| | | | | 362/606 |
| 2016/0103267 | A1 | 4/2016 | An et al. | |
| 2016/0349570 | A1* | 12/2016 | Wu | G02F 1/133504 |
| 2016/0377911 | A1* | 12/2016 | Wu | G02F 1/133504 |
| | | | | 349/106 |
| 2019/0101685 | A1* | 4/2019 | Sasaki | G02B 6/0065 |

FOREIGN PATENT DOCUMENTS

| | | |
|---|---|---|
| CN | 101780699 A | 7/2010 |
| CN | 104149323 A | 11/2014 |
| CN | 204389728 U | 6/2015 |
| CN | 207198363 U | 4/2018 |
| CN | 107991806 A | 5/2018 |

OTHER PUBLICATIONS

Second office action of Chinese application No. 201810933451.9 dated Sep. 29, 2019.
First office action of Chinese application No. 201810933451.9 dated Apr. 29, 2019.

* cited by examiner

LIGHT GUIDE PLATE AND MANUFACTURING METHOD THEREOF, BACKLIGHT MODULE AND DISPLAY DEVICE

CROSS-REFERENCE TO RELATED APPLICATION

This application claims priority to Chinese Patent Application No.: 201810933451.9, filed on Aug. 15, 2018 and entitled "LIGHT GUIDE PLATE AND MANUFACTURING METHOD THEREOF, BACKLIGHT MODULE AND DISPLAY DEVICE", the entire contents of which are incorporated herein by reference.

TECHNICAL FIELD

The present disclosure relates to the field of display technology, and more particular to a light guide plate and a manufacturing method thereof, a backlight module and a display device.

BACKGROUND

A liquid crystal display (LCD) includes a liquid crystal display panel and a backlight module on the back of the liquid crystal display panel. Backlight modules are generally classified into direct-type backlight modules and side-type backlight modules. The conventional side-backlight module includes a light bar and a light guide plate. The light bar is disposed on a side surface of the light guide plate. Light emitted from the light bar is transmitted by the light guide plate and then enters the liquid crystal display panel to provide illumination for the liquid crystal display panel.

SUMMARY

Embodiments of the present disclosure provide a light guide plate and a manufacturing method thereof, a backlight module and a display device. The technical solutions are as follows.

In an aspect, there is provided a light guide plate, comprising: a light guide plate body, and a quantum dot film layer on a light exiting surface of the light guide plate body, wherein the quantum dot film layer is prepared from a transparent material mixed with a quantum dot material by nano imprinting.

Optionally, a plurality of grooves in an array is disposed on the light exiting surface of the light guide plate body, and the grooves are filled with the transparent material mixed with the quantum dot material.

Optionally, the plurality of grooves comprises at least one kind of hemispherical grooves, inverted triangular cone shaped grooves, and inverted frustum pyramid shaped grooves.

Optionally, a width of an aperture of the groove ranges from 200 microns to 400 microns.

Optionally, convex lens structures are on a surface, away from the light guide plate body, of the quantum dot film layer.

Optionally, a plurality of grooves in an array are disposed on the light exiting surface of the light guide plate body, and the grooves are filled with the transparent material mixed with the quantum dot material; and convex lens structures are on a surface, away from the light guide plate body, of the quantum dot film layer.

Optionally, orthographic projections of the convex lens structures on the light guide plate body have no overlapping area with the grooves.

Optionally, the orthographic projections of the convex lens structures on the light guide plate body and the grooves are distributed alternately.

Optionally, the transparent material comprises one of photosensitive adhesive and photocurable coating adhesive.

Optionally, a refractive index of the transparent material is greater than a refractive index of the light guide plate body.

Optionally, a thickness of the quantum dot film layer ranges from 20 microns to 50 microns.

Optionally, a width of an aperture of the groove ranges from 200 microns to 400 microns, a thickness of the quantum dot film layer ranges from 20 microns to 50 microns, and a refractive index of the transparent material is greater than a refractive index of the light guide plate body.

In another aspect, there is provided a manufacturing method of a light guide plate, comprising: providing a light guide plate body; and forming a quantum dot film layer on a light exiting surface of the light guide plate body with a transparent material mixed with a quantum dot material by nano imprinting.

Optionally, forming the quantum dot film layer on the light exiting surface of the light guide plate body with the transparent material mixed with the quantum dot material by nano imprinting comprises: forming a first film layer on the light exiting surface of the light guide plate body with the transparent material mixed with the quantum dot material; and performing hot pressing treatment on the first film layer from one side, away from the light guide plate body, of the first film layer by using an imprint template, to form convex lens structures on the surface, away from the light guide plate body, of the first film layer to obtain the quantum dot film layer.

Optionally, prior to forming the quantum dot film layer on the light exiting surface of the light guide body, the method further comprises: etching the light exiting surface of the light guide plate body to form a plurality of grooves in an array on the light exiting surface.

In yet another aspect, there is provided a backlight module, comprising a light-emitting module and a light guide plate; wherein the light guide plate comprises a light guide plate body and a quantum dot film layer on a light exiting surface of the light guide plate body, wherein the quantum dot film layer is prepared from a transparent material mixed with a quantum dot material by nano imprinting.

Optionally, a plurality of grooves in an array are on the light exiting surface of the light guide plate, and the grooves are filled with the transparent material mixed with the quantum dot material; convex lens structures are on a surface, away from the light guide plate body, of the quantum dot film layer, and orthographic projections of the convex lens structures on the light guide plate body have no overlapping area with the grooves.

Optionally, the backlight module is one of a direct-type backlight module and a side-type backlight module.

In still yet another aspect, there is provided a display device, comprising the backlight module described in the above aspect.

DETAILED DESCRIPTION

Embodiments of the present disclosure will be described in further detail with reference to the accompanying drawings, to present the objects, technical solutions and advantages of the present disclosure more clearly.

Since the quantum dot material has a relatively high color gamut, when the quantum dot material is applied to a backlight module, illumination is provided for a liquid crystal display panel through the quantum dot material, which can improve the display color gamut of a liquid crystal display.

The inventors have known two kinds of backlight modules in which quantum dot materials are applied. In the side-type backlight module using the quantum dot material, a glass tube encapsulated with the quantum dot material is disposed between a light bar and a light guide plate, and light emitted from the light bar excites the quantum dot material to emit light. Light emitted from the quantum dot material is transmitted by the light guide plate and then enters the liquid crystal display panel to provide illumination for the liquid crystal display panel. However, the glass tube breaks easily during assembly, transportation, and usage, which causes failure of the quantum dot material after contacting with water and oxygen. In the other backlight module using the quantum dot material, a quantum dot enhancement film obtained by cutting is disposed on the light exiting side of the light guide plate. After light transmitted by the light guide plate irradiates the quantum dot enhancement film, the quantum dot material in the quantum dot enhancement film is excited to emit light. Light emitted from the quantum dot material enters the liquid crystal display panel to provide illumination for the liquid crystal display panel. However, the cut edges of the quantum dot enhancement film may contact with water and oxygen, which causes failure of the quantum dot material at the cut edges. Therefore, the encapsulation reliability of the quantum dot material in the related art is relatively low.

Figure 1:
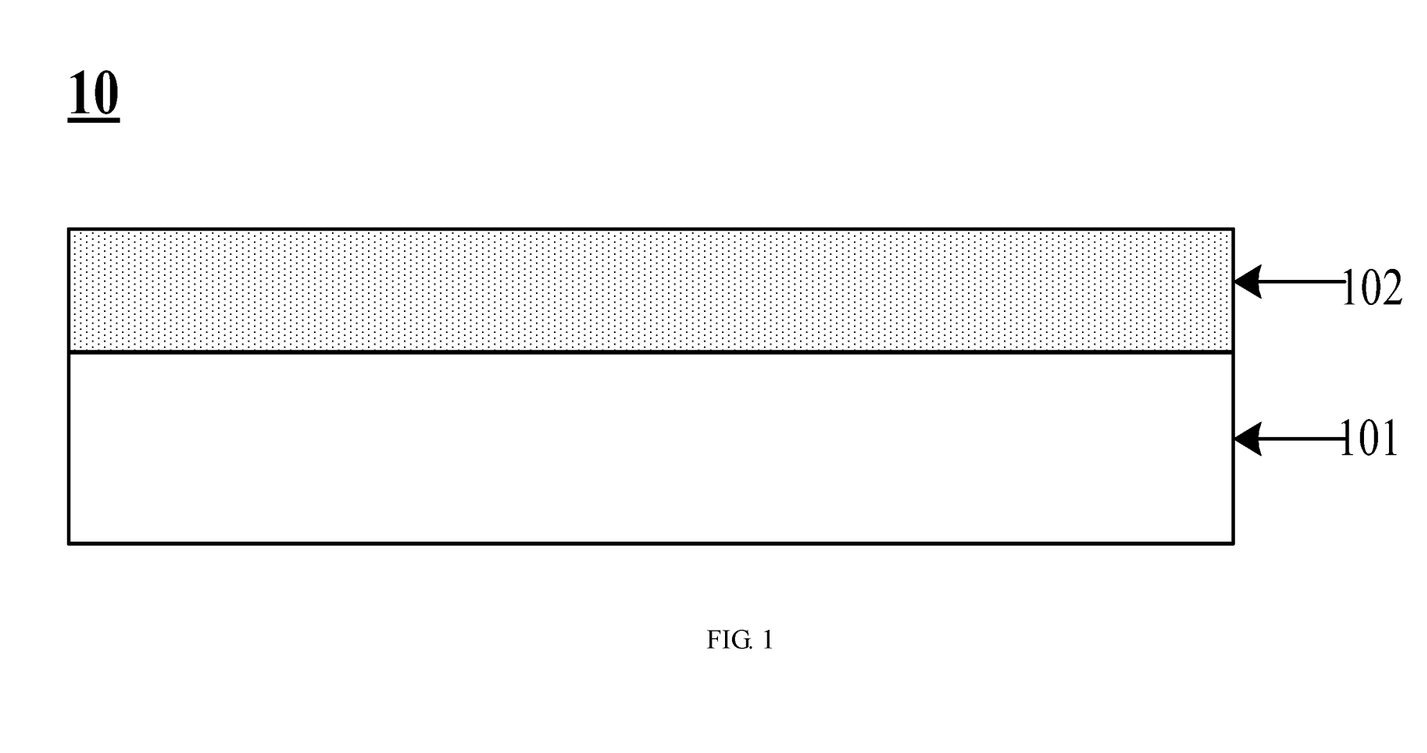
FIG. 1 is a schematic structural diagram of a light guide plate provided in an embodiment of the present disclosure.

FIG. 1 is a schematic structural diagram of a light guide plate provided in an embodiment of the present disclosure. As shown in FIG. 1, the light guide plate 10 includes: a light guide plate body 101, and a quantum dot film layer 102 on a light exiting surface of the light guide plate body 101. The quantum dot film layer 102 is prepared from a transparent material mixed with a quantum dot material by nano imprinting.

Optionally, the light guide plate body may be made of glass. The transparent material may be Ultraviolet Rays (UV) adhesive or photocurable coating adhesive. The transparent material may also be other material with better sealing properties, and the types of transparent materials adopted are not limited in the embodiments of the present disclosure. In the embodiments of the present disclosure, the quantum dot material may be mixed into UV adhesive. As the bonding strength of the UV adhesive is high, after the quantum dot material is mixed into the UV adhesive, the sealing degree of the UV adhesive to the quantum dot material is relatively high. Moreover, the quantum dot material can be quickly fixed at a position of the UV adhesive after being mixed into the UV adhesive, which can ensure the stability of the structure of the quantum dot film layer. In addition, the UV adhesive is completely transparent after being cured, thereby not affecting the light exit of the light guide plate.

In the embodiments of the present disclosure, since the quantum dot film layer on the light exiting surface of the light guide plate body is prepared from a transparent material mixed with the quantum dot material by nano imprinting, without cutting the quantum dot film layer, failure of the quantum dot material caused by contact with water and oxygen of cut edges of the quantum dot film layer is avoided.

Optionally, the thickness of the quantum dot film layer ranges from 20 microns to 50 microns. The quantum dot material includes quantum dots of at least one color.

In summary, according to the light guide plate provided in the embodiment of the present disclosure, since the quantum dot film layer is made of the transparent material mixed with the quantum dot material, the transparent material, after being cured, can play a good sealing function to the quantum dot material. Therefore, the quantum dot material does not need to be encapsulated in a glass tube. In addition, the quantum dot film layer does not need to be cut. Thus, the failure of the quantum dot material caused by contact with water and oxygen of the cut edges of the quantum dot film layer is avoided. Therefore, the encapsulation reliability of the quantum dot material is relatively high.

Optionally, the refractive index of the transparent material is greater than the refractive index of the light guide plate body. That is, the refractive index of the quantum dot film layer is greater than the refractive index of the light guide plate body. When the refractive index of the transparent material is greater than the refractive index of the light guide plate body, light is transmitted from the light guide plate body to the quantum dot film layer. That is, light is transmitted from an optically thinner medium to an optically denser medium. Since total reflection does not occur when light is incident from the light thinner medium to the optically denser medium, light-emitting efficiency of the light guide plate can be improved by enabling the refractive index of the transparent material to be greater than the refractive index of the light guide plate body.

Optionally, a plurality of grooves in an array are disposed on the light exiting surface of the light guide plate body; and/or convex lens structures are disposed on a surface, away from the light guide plate body, of the quantum dot film layer. That is, in the light guide plate provided in the embodiments of the present disclosure, a plurality of grooves in an array are disposed on the light exiting surface of the light guide plate body. Alternatively, convex lens structures are disposed on a surface, away from the light guide plate body, of the quantum dot film layer. Still alternatively, a plurality of grooves in an array are disposed on the light exiting surface of the light guide plate body, and convex lens structures are disposed on a surface of the light guide plate body. The structures of the three light guide plates will be described respectively in the following embodiments of the present disclosure.

Figure 2:
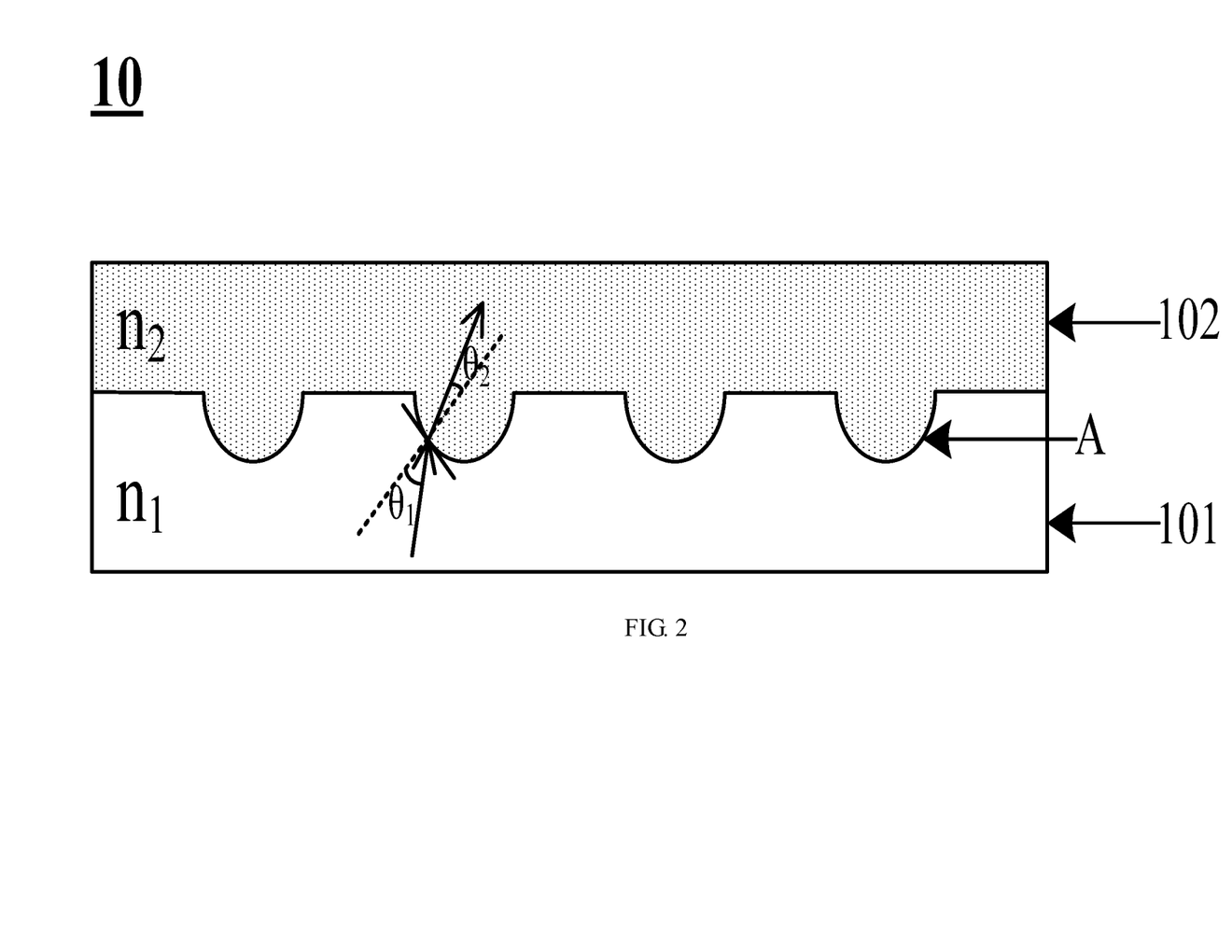
FIG. 2 is a schematic structural diagram of another light guide plate provided in an embodiment of the present disclosure.

FIG. 2 is a schematic structural diagram of another light guide plate provided in an embodiment of the present disclosure. As shown in FIG. 2, a plurality of grooves A in an array are disposed on a light exiting surface of a light guide plate body 101 of the light guide plate 10. The grooves A are filled with a transparent material mixed with a quantum dot material.

Optionally, the groove may be at least one of hemispherical, inverted triangular cone shaped, and inverted frustum pyramid shaped. That is, the plurality of grooves include at least one kind of hemispherical grooves, inverted triangular cone shaped grooves, and inverted frustum pyramid shaped grooves. Alternatively, the groove may be of a circular ink structure, a laser-engraved crater structure or the like. The shape of the grooves is not limited in the embodiments of the present disclosure.

It should be noted that when the refractive index of the transparent material used for preparing the quantum dot film layer is greater than the refractive index of the light guide plate body, according to the principle of light refraction, light is transmitted from the light guide plate body to the quantum dot film layer. That is, when light is transmitted from an optically thinner medium to an optically denser medium. The incidence angle $\theta1$ and the refraction angle $\theta2$ of light satisfy $n1 \sin \theta1 = n2 \sin \theta2$. $n1$ represents the refractive index of the light guide plate body, and $n2$ represents the refractive index of the quantum dot film layer. Therefore, the incidence angle $\theta1$ of light is greater than the refraction angle $\theta2$ when $n1$ is less than $n2$. By disposing grooves on the light exiting surface of the light guide plate body, light may be concentrated when it is transmitted from the light guide plate body to the quantum dot film layer, thereby improving the light-emitting efficiency of the light guide plate body.

Optionally, the width of the aperture of the groove ranges from 200 microns to 400 microns. Exemplarily, when the groove is in the shape of a hemisphere, the width of the aperture of the groove refers to the diameter of the hemisphere. When the groove is in the shape of an inverted triangular cone, the width of the aperture of the groove refers to the length of the side on the bottom surface of the inverted triangular cone. When the groove is in the shape of an inverted frustum pyramid, the width of the aperture of the groove refers to the width of the aperture of the bottom surface of the inverted frustum pyramid.

Figure 3:
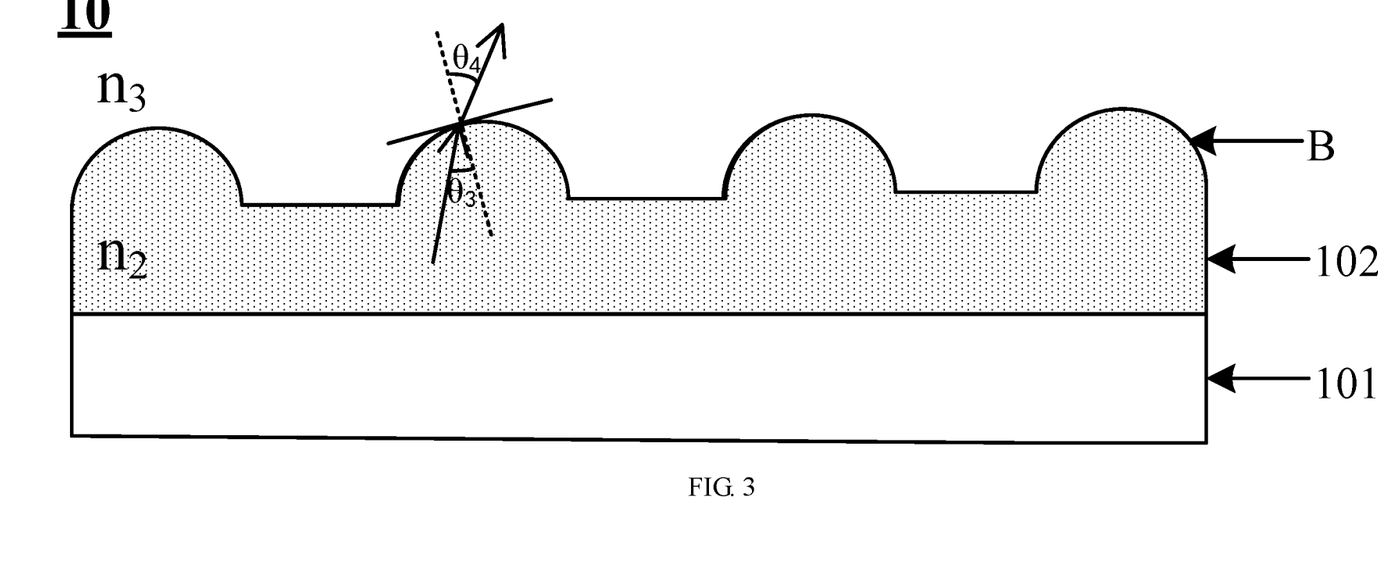
FIG. 3 is a schematic structural diagram of yet another light guide plate provided in an embodiment of the present disclosure.

FIG. 3 is a schematic structural diagram of yet another light guide plate provided in an embodiment of the present disclosure. As shown in FIG. 3, convex lens structures B are disposed on a surface, away from the light guide plate body 101, of the quantum dot film layer 102 of the light guide plate 10.

According to the refraction principle of light, light is transmitted from the quantum dot film layer to air. That is, when light is transmitted from an optically denser medium to an optically thinner medium, the incidence angle $\theta3$ and the refraction angle $\theta4$ of light satisfy $n2 \sin \theta3 = n3 \sin \theta4$. $n2$ represents the refractive index of the quantum dot film layer, and $n3$ represents the refractive index of air. Therefore, the incidence angle $\theta3$ of light is less than the refraction angle $\theta4$ when $n2$ is greater than $n3$. By disposing the convex lens structures on the light exiting surface of the quantum dot film layer, light may be concentrated when it is transmitted from the quantum dot film layer to air, thereby improving the light-emitting efficiency of the light guide plate body.

Figure 4:
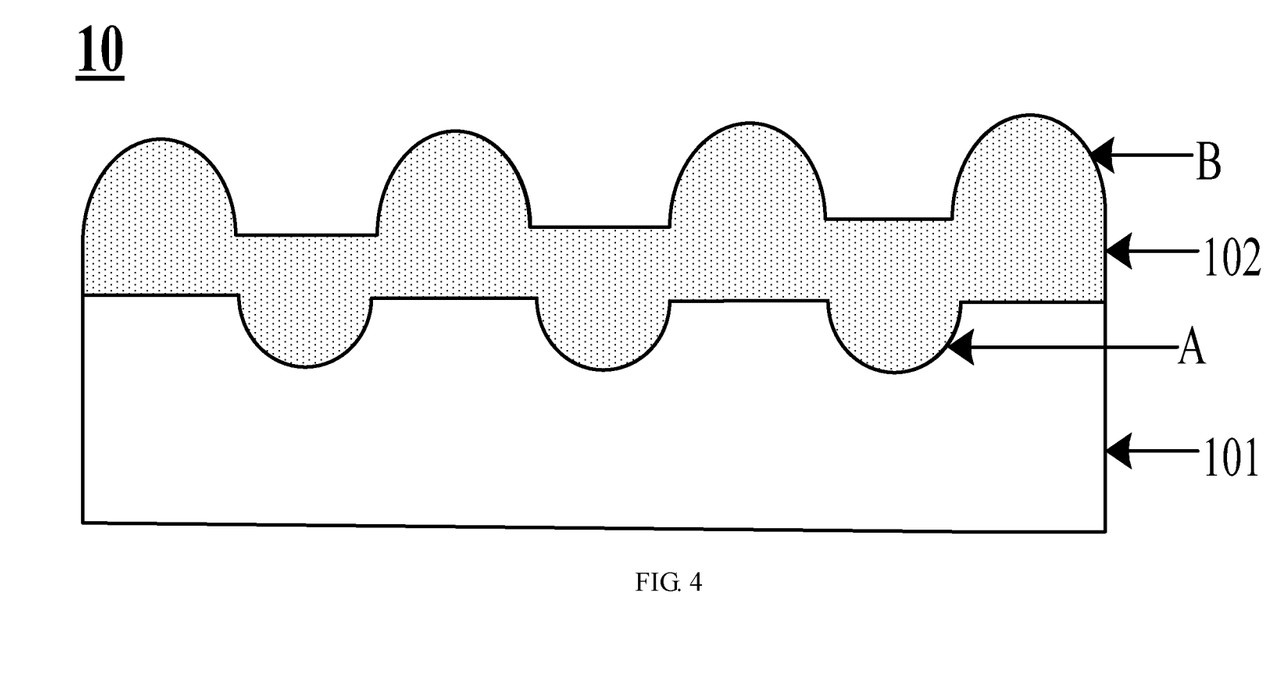
FIG. 4 is a schematic structural diagram of still yet another light guide plate provided in an embodiment of the present disclosure.

FIG. 4 is a schematic structural diagram of still yet another light guide plate provided in an embodiment of the present disclosure. As shown in FIG. 4, a plurality of grooves A in an array are disposed on the light exiting surface of the light guide plate body 101 of the light guide plate 10, and the grooves A are filled with a transparent material mixed with the quantum dot material. Convex lens structures B are disposed on a surface, away from the light guide plate body 101, of the quantum dot film layer 102 of the light guide plate 10.

The structure of the light guide plate body in the light guide plate as shown in FIG. 4 may be made reference to description of the structure of the light guide plate body in the light guide plate as shown in FIG. 2. The structure of the quantum dot film layer in the light guide plate as shown in FIG. 4 may be made reference to description of the structure of the quantum dot film layer in the light guide plate as shown in FIG. 3, and will not be repeated in the embodiments of the present disclosure.

Optionally, as shown in FIG. 4, orthographic projections of the convex lens structures B on the light guide plate body 101 have no overlapping portion with the grooves A.

Figure 5:
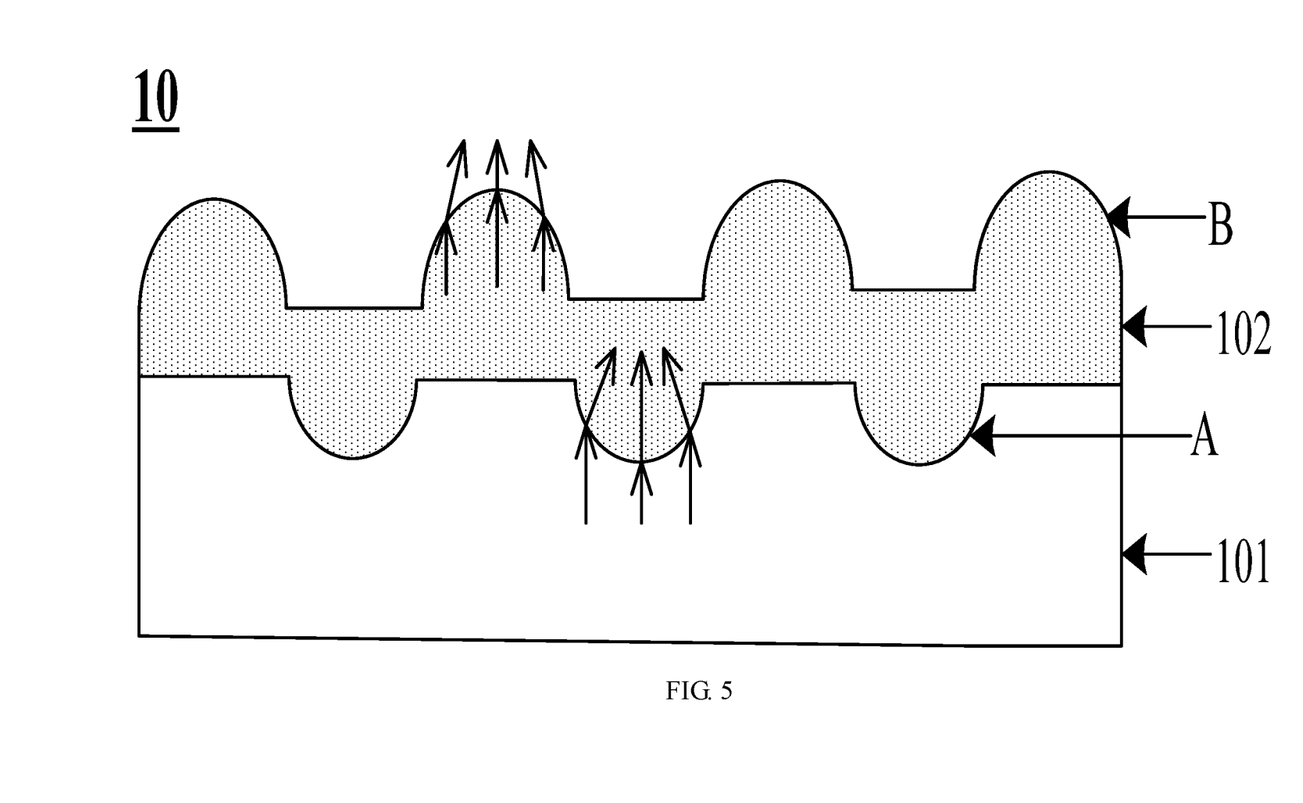
FIG. 5 is a schematic diagram of light transmission in a light guide plate provided in an embodiment of the present disclosure.

Exemplarily, FIG. 5 is a schematic diagram of light transmission in a light guide plate according to an embodiment of the present disclosure. As shown in FIG. 5, the grooves A and the convex lens structures B may function to concentrate light. When the orthographic projections of the convex lens structures B on the light guide plate body 101 have no overlapping portion with the orthographic projections of the grooves A on the light guide plate 101, light concentrated by the grooves A and light concentrated by the convex lens structures B may be respectively emitted from corresponding positions on the light exiting surface of the light guide plate. Therefore, the light-emitting uniformity of the light guide plate can be improved.

Optionally, the orthographic projections of the convex lens structures on the light guide plate body and the grooves are distributed alternately. Alternatively, the orthographic projections of the convex lens structures on the light guide plate body may have overlapping portions with the grooves, which is not limited in the embodiments of the present disclosure.

In summary, according to the light guide plate provided in the embodiment of the present disclosure, since the quantum dot film layer is made from the transparent material mixed with the quantum dot material, the transparent material, after being cured, can play a good sealing role in the quantum dot material. Therefore, the quantum dot material does not need to be encapsulated in a glass tube. In addition, the quantum dot film layer does not need to be cut, which can avoid failure of the quantum dot material caused by contact with water and oxygen of cut edges of the quantum dot film layer. Therefore, the encapsulation reliability of the quantum dot material is relatively high.

Figure 6:
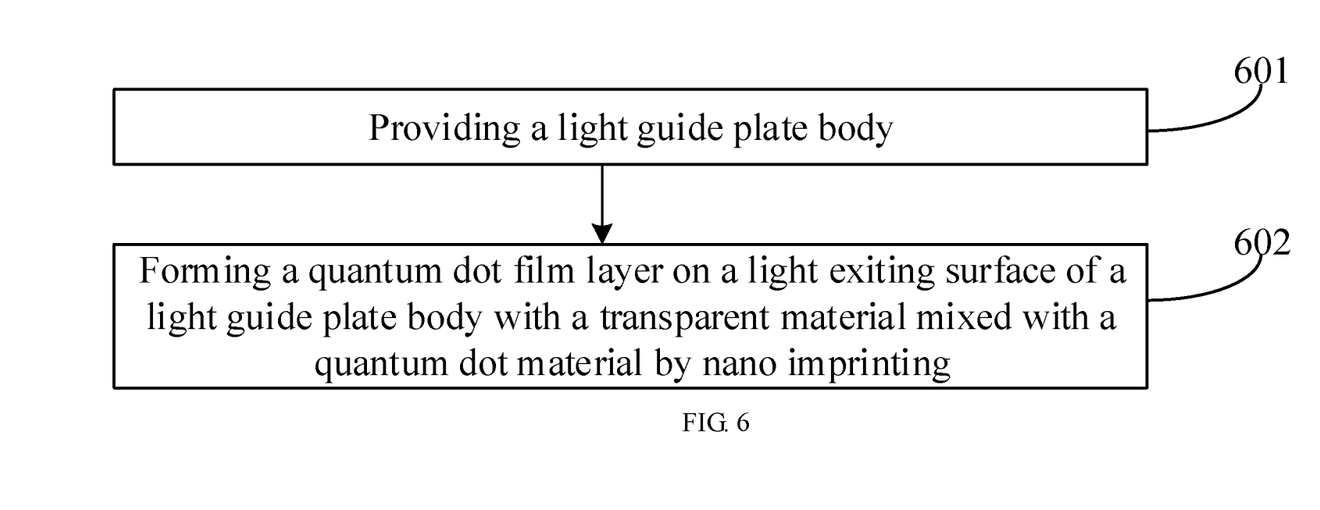
FIG. 6 is a flowchart of a manufacturing method of a light guide plate provided in an embodiment of the present disclosure.

FIG. 6 is a flowchart of a manufacturing method of a light guide plate provided in an embodiment of the present disclosure. As shown in FIG. 6, the method may include the following working procedures.

In step 601, a light guide plate body is provided.

In step 602, a quantum dot film layer is formed on a light exiting surface of a light guide plate body with a transparent material mixed with a quantum dot material by nano imprinting.

Optionally, the refractive index of the transparent material has is greater than the refractive index of the light guide plate body.

In summary, according to the manufacturing method of the light guide plate provided in the embodiment of the present disclosure, since the quantum dot film layer is made from the transparent material mixed with the quantum dot material, the transparent material, after being cured, can play a good sealing role in the quantum dot material. Therefore, the quantum dot material does not need to be encapsulated in a glass tube. In addition, the quantum dot film layer does not need to be cut, which can avoid failure of the quantum dot material caused by contact with water and oxygen of cut edges of the quantum dot film layer. Therefore, the encapsulation reliability of the quantum dot material is relatively high.

Figure 7:
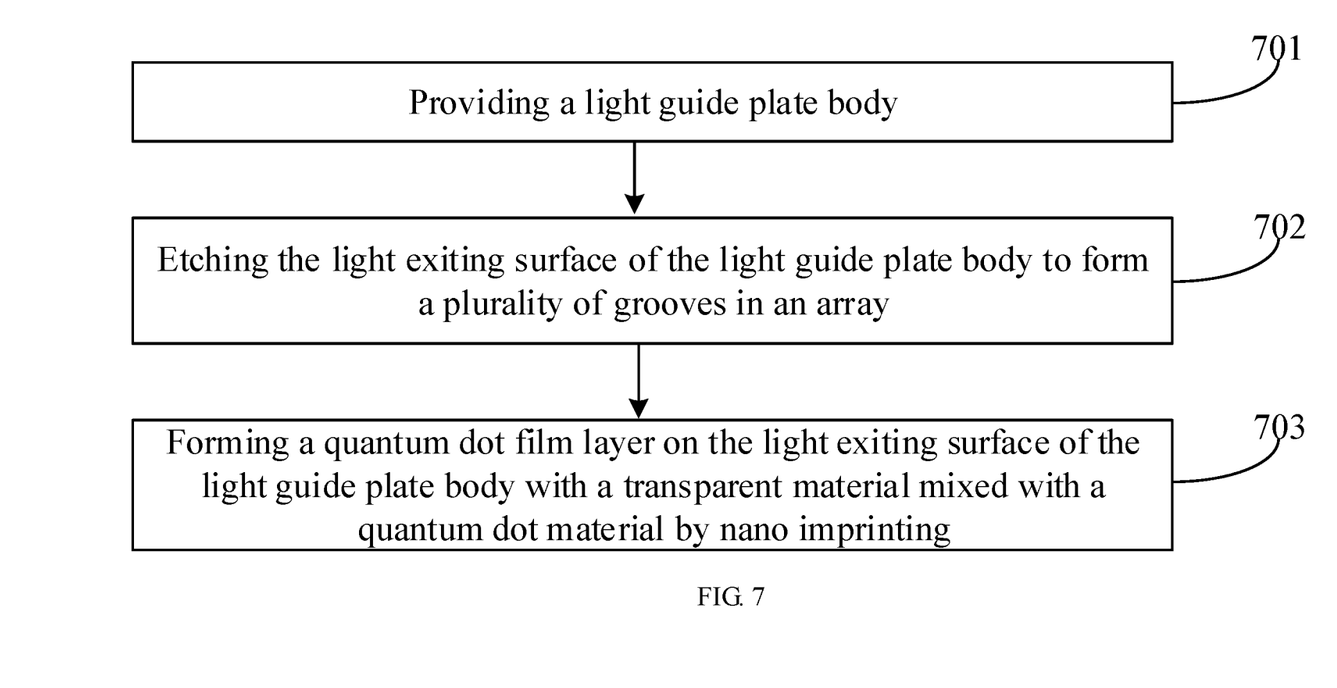
FIG. 7 is a flowchart of another manufacturing method of a light guide plate provided in an embodiment of the present disclosure.

FIG. 7 is a flowchart of a manufacturing method of a further light guide plate provided in an embodiment of the present disclosure. As shown in FIG. 7, the method may include the following working procedures.

In step 701, a light guide plate body is provided.

Optionally, the light guide plate body is made of glass or polymethyl methacrylate (PMMA) (commonly known as organic glass).

In step 702, the light exiting surface of the light guide plate body is etched to form a plurality of grooves in an array.

Optionally, the light exiting surface of the light guide plate body may be etched by a patterning process, dry etching or wet etching, which is not limited in the embodiments of the present disclosure. Here, the patterning process includes: photoresist coating, exposure, development, etching, and photoresist stripping.

In step 703, a quantum dot film layer is formed on the light exiting surface of the light guide plate body with a transparent material mixed with a quantum dot material by nano imprinting.

Optionally, the refractive index of the transparent material is greater than the refractive index of the light guide plate body. When the refractive index of the transparent material is greater than the refractive index of the light guide plate body, light is transmitted from the light guide plate body to the quantum dot film layer. That is, light is transmitted from an optically thinner medium to an optically denser medium. Since total reflection will not occur when light is incident from the optically thinner medium to the optically denser medium, the light-emitting efficiency of the light guide plate can be improved by enabling the refractive index of the transparent material to be greater than the refractive index of the light guide plate body.

Optionally, the thickness of the quantum dot film layer ranges from 20 microns to 50 microns.

Optionally, the implementation process of step 703 includes the following procedures.

In step 7031, a first film layer is formed on the light exiting surface of the light guide plate body with a transparent material mixed with a quantum dot material.

Optionally, the light exiting surface of the light guide body is coated with the transparent material mixed with the quantum dot material, to form the first film layer.

In step 7032, hot pressing treatment is performed on the first film layer from the side, away from the light guide plate body, of the first film layer by using an imprint template, to form convex lens structures on the surface, away from the light guide plate body, of the first film layer to obtain the quantum dot film layer.

Optionally, after performing hot pressing treatment on the first film layer from the side, away from the light guide plate body, of the first film layer by using the imprint template to obtain the quantum dot film layer, ultraviolet exposure treatment may further be performed on the quantum dot film layer, to cure the quantum dot film layer.

Optionally, the quantum dot film layer may also be obtained by forming the convex lens structures on the surface, away from the light guide plate body, of the first film layer by a patterning process. The preparation process of the convex lens structure is not limited in the embodiments of the present disclosure.

It should be noted that the sequence of steps in the manufacturing method of the light guide plate provided in the embodiments of the present disclosure may be appropriately adjusted, and the steps may also be correspondingly added or deleted based on situation. For example, step 702 may not be performed. Any methods that can be easily derived by a person skilled in the art within the technical scope of the present disclosure shall be included in the protection scope of the present disclosure, and therefore are not described again.

In summary, according to the manufacturing method of the light guide plate provided in the embodiment of the present disclosure, since the quantum dot film layer is made of the transparent material mixed with the quantum dot material, the transparent material, after being cured, can play a good sealing role in the quantum dot material. Therefore, the quantum dot material does not need to be encapsulated in a glass tube. In addition, the quantum dot film layer does not need to be cut, which can avoid failure of the quantum dot material caused by contact with water and oxygen of cut edges of the quantum dot film layer. Therefore, the encapsulation reliability of the quantum dot material is relatively high.

With respect to the structures in the above method embodiments, the structure and material of the light guide plate have been described in detail in the device embodiments, and will not be described in detail here.

An embodiment of the present disclosure provides a backlight module. The backlight module includes a light-emitting module and a light guide plate 10 as shown in any of FIGS. 1 to 4.

Optionally, the backlight module provided in the embodiments of the present disclosure may be a side-type backlight module or a direct-type backlight module.

Figure 8:
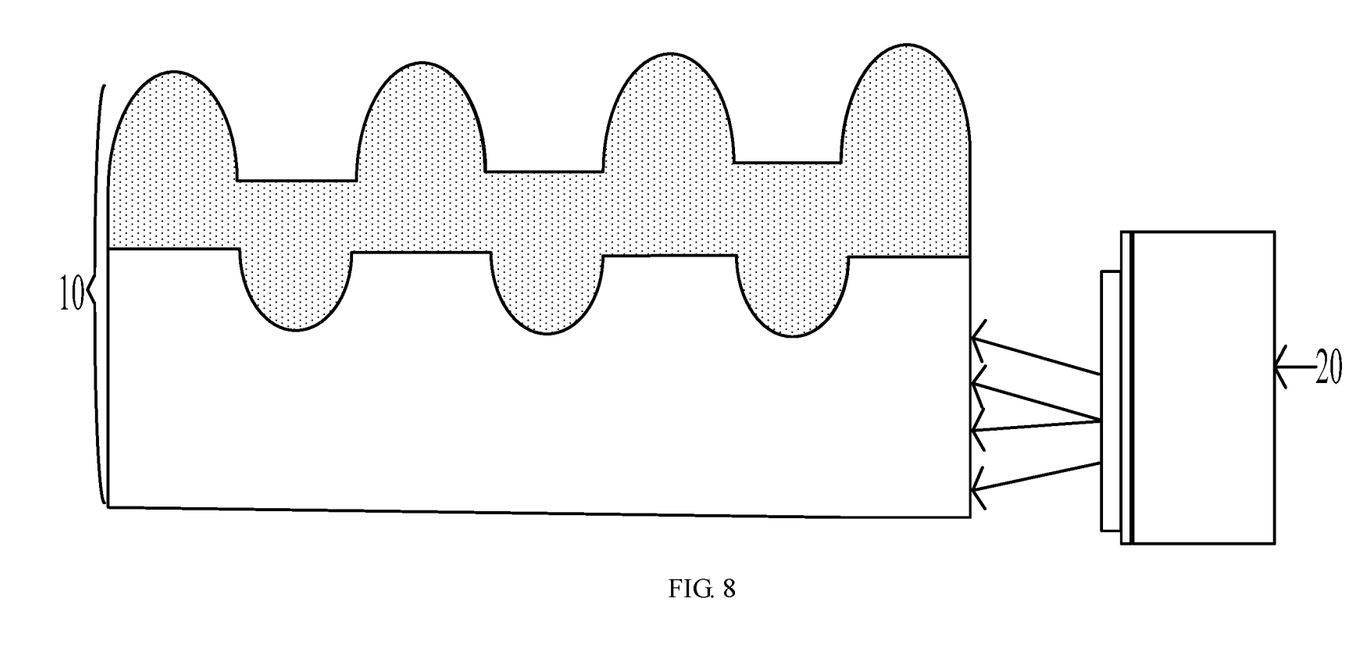
FIG. 8 is a schematic structural diagram of a backlight module provided in an embodiment of the present disclosure.

Exemplarily, FIG. 8 is a schematic structural diagram of a side-type backlight module provided in an embodiment of the present disclosure. As shown in FIG. 8, the side-type backlight module includes a light-emitting module 20 and a light guide plate 10 as shown in FIG. 4. The light-emitting module 20 is disposed on a side surface of the light guide plate 10.

Optionally, when the light-emitting module is configured to provide blue light, for example, when a blue light-emitting diode (LED) is adopted in the light-emitting module, the quantum dot material in the quantum dot film layer may include a red quantum dot material and a green quantum dot material. Blue light emitted from the blue LED excites the red quantum dot material and the green quantum dot material to emit red light and green light, respectively. Blue light, green light and red light can be mixed to form white light, to provide illumination for a liquid crystal display panel.

Optionally, when the light-emitting module is configured to provide red light, the quantum dot material in the quantum dot film layer may include a blue quantum dot material and a green quantum dot material. When the light-emitting module is configured to provide green light, the quantum dot material in the quantum dot film layer may include a blue quantum dot material and a red quantum dot material.

In summary, according to the backlight module provided in the embodiment of the present disclosure, since the quantum dot film layer is made of the transparent material mixed with the quantum dot material, the transparent material, after being cured, can play a good sealing role in the quantum dot material. Therefore, the quantum dot material does not need to be encapsulated in a glass tube. In addition, the quantum dot film layer does not need to be cut, which can avoid failure of the quantum dot material caused by contact with water and oxygen of cut edges of the quantum dot film layer. Therefore, the encapsulation reliability of the quantum dot material is relatively high.

An embodiment of the present disclosure further provides a display device. The display device includes the backlight module as shown in FIG. 8.

Optionally, the display device provided in the embodiments of the present disclosure may be a liquid crystal display, an electronic paper, a mobile phone, a tablet computer, a TV, a display, a laptop computer, a digital photo frame, a navigator, or any other product or part with a display function.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A light guide plate, comprising:
a light guide plate body, and a quantum dot film layer on a light exiting surface of the light guide plate body, wherein the quantum dot film layer is prepared from a transparent material mixed with a quantum dot material by nano imprinting;
wherein a plurality of grooves in an array are disposed on the light exiting surface of the light guide plate body, and the grooves are filled with the transparent material mixed with the quantum dot material; and convex lens structures are on a surface, away from the light guide plate body, of the quantum dot film layer; and
wherein either orthographic projections of the convex lens structures on the light guide plate body have no overlapping area with the grooves, or the orthographic projections of the convex lens structures on the light guide plate body and the grooves are distributed alternately.

2. The light guide plate according to claim 1, wherein the transparent material comprises an Ultraviolet Rays adhesive.

3. The light guide plate according to claim 1, wherein the plurality of grooves comprises at least one kind of hemispherical grooves, inverted triangular cone shaped grooves, and inverted frustum pyramid shaped grooves.

4. The light guide plate according to claim 1, wherein a width of an aperture of the groove ranges from 200 microns to 400 microns.

5. The light guide plate according to claim 1, wherein light concentrated by the grooves and light concentrated by the convex lens structures are respectively emitted from corresponding positions on the light exiting surface of the light guide plate.

6. The light guide plate according to claim 1, wherein the transparent material comprises one of a photosensitive adhesive and a photocurable coating adhesive.

7. The light guide plate according to claim 1, wherein a refractive index of the transparent material is greater than a refractive index of the light guide plate body.

8. The light guide plate according to claim 1, wherein a thickness of the quantum dot film layer ranges from 20 microns to 50 microns.

9. The light guide plate according to claim 1, wherein a width of an aperture of the groove ranges from 200 microns to 400 microns, a thickness of the quantum dot film layer ranges from 20 microns to 50 microns, and a refractive index of the transparent material is greater than a refractive index of the light guide plate body.

10. A manufacturing method of a light guide plate, comprising:
providing a light guide plate body; and
forming a quantum dot film layer on a light exiting surface of the light guide plate body with a transparent material mixed with a quantum dot material by nano imprinting;
wherein a plurality of grooves in an array are disposed on the light exiting surface of the light guide plate body, and the grooves are filled with the transparent material mixed with the quantum dot material; and convex lens structures are on a surface, away from the light guide plate body, of the quantum dot film layer; and
wherein either orthographic projections of the convex lens structures on the light guide plate body have no overlapping area with the grooves, or the orthographic projections of the convex lens structures on the light guide plate body and the grooves are distributed alternately.

11. The method according to claim 10, wherein forming the quantum dot film layer on the light exiting surface of the light guide plate body with the transparent material mixed with the quantum dot material by nano imprinting comprises:
forming a first film layer on the light exiting surface of the light guide plate body with the transparent material mixed with the quantum dot material; and
performing hot pressing treatment on the first film layer from one side, away from the light guide plate body, of the first film layer by using an imprint template, to form the convex lens structures on the surface, away from the light guide plate body, of the first film layer to obtain the quantum dot film layer.

12. The method according to claim 11, wherein after performing hot pressing treatment, ultraviolet exposure treatment is performed on the quantum dot film layer to cure the quantum dot film layer.

13. The method according to claim 10, wherein prior to forming the quantum dot film layer on the light exiting surface of the light guide body, the method further comprises:
etching the light exiting surface of the light guide plate body to form the plurality of grooves in an array on the light exiting surface.

14. The method according to claim 10, wherein the transparent material comprises an Ultraviolet Rays adhesive; and wherein the transparent material, after being cured, seals the quantum dot material.

15. The method according to claim 10, wherein light concentrated by the grooves and light concentrated by the convex lens structures is respectively emitted from corresponding positions on the light exiting surface of the light guide plate.

16. A backlight module, comprising a light-emitting module and a light guide plate;

wherein the light guide plate comprises a light guide plate body and a quantum dot film layer on a light exiting surface of the light guide plate body, wherein the quantum dot film layer is prepared from a transparent material mixed with a quantum dot material by nano imprinting;

wherein a plurality of grooves in an array are on the light exiting surface of the light guide plate, and the grooves are filled with the transparent material mixed with the quantum dot material; convex lens structures are on a surface, away from the light guide plate body, of the quantum dot film layer; and wherein either orthographic projections of the convex lens structures on the light guide plate body have no overlapping area with the grooves, or the orthographic projections of the convex lens structures on the light guide plate body and the grooves are distributed alternately.

17. The backlight module according to claim 16, wherein light concentrated by the grooves and light concentrated by the convex lens structures is respectively emitted from corresponding positions on the light exiting surface of the light guide plate.

18. The backlight module according to claim 16, wherein the backlight module is one of a direct-type backlight module and a side-type backlight module.

19. A display device, comprising the backlight module according to claim 16.

20. The backlight module according to claim 16, wherein the transparent material comprises an Ultraviolet Rays adhesive.

* * * * *